United States Patent
Durieux et al.

(10) Patent No.: US 12,044,338 B2
(45) Date of Patent: Jul. 23, 2024

(54) MALE OR FEMALE FLUID COUPLING ELEMENT AND FLUID COUPLING INCLUDING SUCH AN ELEMENT

(71) Applicant: STAUBLI FAVERGES, Faverges-Seythenex (FR)

(72) Inventors: Christophe Durieux, Gilly sur Isere (FR); Serafim Marques Barroca, Albertville (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 296 days.

(21) Appl. No.: 17/729,069

(22) Filed: Apr. 26, 2022

(65) Prior Publication Data

US 2022/0349503 A1  Nov. 3, 2022

(30) Foreign Application Priority Data

Apr. 29, 2021  (FR) ........................... 2104493

(51) Int. Cl.
*F16L 37/40* (2006.01)
*F16L 17/06* (2006.01)
(Continued)

(52) U.S. Cl.
CPC .............. *F16L 17/06* (2013.01); *F16L 37/02* (2013.01); *F16L 37/34* (2013.01); *F16L 37/40* (2013.01); *F16L 37/50* (2013.01)

(58) Field of Classification Search
CPC ......... F16L 37/34; F16L 37/413; F16L 29/04; F16L 29/02; F16L 27/00; F16L 37/50; F16L 17/06; F16L 37/02; F16L 37/40
See application file for complete search history.

(56) References Cited

U.S. PATENT DOCUMENTS 3,508,580 A * 4/1970 Snyder, Jr. .............. F16L 37/50
  137/614.04
8,028,718 B2 * 10/2011 Tiberghien .............. F16L 29/04
  251/149.6
(Continued)

FOREIGN PATENT DOCUMENTS

AT       196437 B       3/1958
CN    104565629 A *    4/2015  .............. F16L 27/00
(Continued)

OTHER PUBLICATIONS

France Search Report dated Dec. 2, 2021, for France Application No. 2104493 filed Apr. 29, 2021.

*Primary Examiner* — Marina A Tietjen

(57) ABSTRACT

This coupling element has a body and a nozzle. The body delimits a housing for partially receiving the nozzle. The nozzle has a tubular part and a flange received in the housing. Two sealing barriers formed by at least one sealing joint are interposed between a rear surface of the flange and a front face of the body, between a front surface of the flange and a rear face of the body, respectively. A plug caps an inner conduit. Portions of the inner conduit communicate through at least one passage opening into an inner volume of the nozzle, forward of the plug, and on an outer peripheral surface of the flange. An inner chamber is separated from the inner conduit by the body, the flange, the plug and the first sealing barrier.

21 Claims, 11 Drawing Sheets

(51) Int. Cl.
    *F16L 37/02*     (2006.01)
    *F16L 37/34*     (2006.01)
    *F16L 37/50*     (2006.01)

(56) References Cited

U.S. PATENT DOCUMENTS

2016/0010772 A1*   1/2016   Tiberghien ................ F28F 3/12
    285/24
2019/0301651 A1*  10/2019   Tiberghien .......... F16K 31/5286

FOREIGN PATENT DOCUMENTS

| CN | 205896502 U | 1/2017 |
|---|---|---|
| EP | 2966396 A1 | 1/2016 |

* cited by examiner

MALE OR FEMALE FLUID COUPLING ELEMENT AND FLUID COUPLING INCLUDING SUCH AN ELEMENT

The present invention relates to a male or female fluid coupling element, as well as a connection making it possible to join pressurized fluid pipelines, and including such a coupling element.

One field of application of the invention is that of cooling circuits in which male and female coupling elements can be mounted on supports, such as plates equipped with at least one fluid circulation circuit. With such assemblies, it is necessary to account for possible misalignments between the male and female coupling elements, allowing for the possibility of adjusting a nozzle of one of the coupling elements in a direction perpendicular to the press-fitting axis.

Thus, it is known from U.S. Pat. No. 3,508,580 to provide a male coupling element with an nozzle equipped with a flange housed in an inner volume for receiving the body of the male element, with a sealing joint interposed between a rear surface of the flange and the body. Sliding the flange within the inner receiving volume makes it possible to adjust the position of the male element nozzle on the press-fitting axis defined by the female element. In this embodiment, in the uncoupled configuration of the coupling, when the valve is in the closed position of the male element, the fluid pressure within the male coupling element induces a forward axial force on the nozzle that is exerted on a section defined by a sealing section at the joint interposed between a rear surface of the flange and the body, this force having the effect of pressing the front face of the flange against the body of the male element. Balls should be provided to facilitate the radial movement of the flange in the inner volume of the body. In practice, the longitudinal pressure force opposes the alignment of the central axes of the male and female coupling elements, which occurs before the fluid conduits are brought into communication. This results in relatively rapid deterioration of the front end of the nozzle of the male element and the frustoconical mouth of the female element that come into contact with each other during a press-fitting movement.

The invention intends to respond to these problems more particularly by proposing a new coupling element in which the effect of an axial pressure force exerted on the nozzle is reduced, which facilitates radial displacements of the nozzle, without increasing the pressure losses within the coupling, in the coupled configuration thereof.

To this end, the invention relates to a male or female fluid coupling element, designed for joining pressurized fluid pipelines,
- said coupling element including a body, an nozzle and a valve;
- the body extending along a longitudinal axis, between a front side facing in a direction of press-fitting the coupling element with a complementary element of the connection and a rear side, opposite the front side;
- the body delimiting, on the one hand, a housing for partially receiving the nozzle and, on the other hand, at least a first portion of an inner conduit for circulating fluid in the coupling element, the first portion being arranged towards the rear in relation to the receiving housing and communicating fluidly with the receiving housing;
- the nozzle comprising a tubular part projecting forward from the body;
- a second portion of the inner conduit being arranged in an inner volume of the nozzle and delimited at the front by a front opening of the tubular part;
- the valve being housed in the inner volume of the nozzle with the possibility of movement between an advanced closing position, where the valve caps the front opening of the tubular part, and a retracted opening position, where the valve does not oppose the circulation of fluid in the inner conduit;
- the nozzle being equipped with a flange formed projecting from and towards the rear in relation the tubular part, the flange being received in the receiving housing with the possibility of movement in relation to the body only parallel to a plane radial to the longitudinal axis; and
- a first sealing barrier formed of at least one sealing joint being interposed between a rear surface of the flange and a front face of the body, this front face delimiting the receiving housing on the rear side and being arranged opposite the rear surface of the flange.

According to the invention
- a second sealing barrier formed by at least one sealing joint is interposed between a front surface of the flange and a rear face of the body, this rear face delimiting the receiving housing on the front side and being arranged opposite the front surface of the flange;
- a third portion of the inner conduit, intermediate between the first portion and the second portion, is delimited radially around the flange, between an outer peripheral surface of the flange and an inner peripheral surface of the body delimiting the receiving housing radially to the longitudinal axis;
- a plug caps the second portion of the inner conduit at the rear;
- the second and third portions of the inner conduit are in fluid communication by at least one passage arranged in the nozzle and which opens into the inner volume of the nozzle, forward of the plug, and the outer peripheral surface of the flange; and
- an inner chamber is arranged in the coupling element and separated from the inner conduit by the body, the flange, the plug and the first sealing barrier.

With the invention, the combination of the first and second sealing barriers makes it possible to reduce the stress of the pressurized fluid on the flange, thereby facilitating the alignment of the nozzle on the body of the complementary coupling member. The first, second, and third portions of the inner conduit for circulation of fluid and the passage(s) enable a circulation with minimized pressure drops when the coupling element is coupled with a complementary coupling element. Furthermore, the inner chamber is isolated from the inner conduit and thus at a different pressure than the fluid present in the connection, which makes it possible to equalize the pressure forces exerted axially on the nozzle, and thus on its flange, in whole or in part.

According to advantageous but non-mandatory aspects of the invention, such a coupling element may incorporate one or more of the following features, taken in any technically permissible combination:
- A ratio of an area of a sealing section delimited by the second sealing barrier to an area of a sealing section delimited by the first sealing barrier is between 0.85 and 1.15, preferably between 0.95 and 1.05, more preferably 1.
- At least one vent connects the inner chamber to the exterior of the coupling member and extends through the body, preferably parallel to the radial plane.

The inner chamber is delimited by an inner part of the body, which is frustoconical in shape and centered on an axis parallel to the longitudinal axis, converges towards the rear of the coupling element, and which is connected to an intermediate portion of the body arranged around the inner part by at least one connecting bracket, while the first portion of the inner conduit extends between the inner part and the intermediate portion of the body and while the receiving housing opens towards the rear into the first portion of the inner conduit.

A ratio between a thickness of a connecting bracket, measured parallel to the longitudinal axis of the body, and a length of the inner part of the body, measured along the same longitudinal axis, is strictly less than 1, preferably between 0.15 and 0.40, more preferably 0.25.

The inner part of the body delimiting the inner chamber, the connecting bracket(s) and the intermediate portion of the body together form a single piece.

The flange comprises a front collar forming the front surface of the flange and a rear collar forming the rear surface of the flange, wherein when an outer peripheral surface of the front collar is radially in contact with the inner peripheral surface of the body radially delimiting the receiving volume, an annular clearance, of a non-zero minimum radial thickness, exists between an outer peripheral surface of the rear collar and the inner peripheral surface of the body and wherein the first and second portions of the inner conduit are in fluid communication through the annular clearance.

The front and rear collars define between them, along the longitudinal axis, an annular volume open to the receiving housing, while each passage opens into this annular volume.

The body comprises a cover, fitted in a skirt of the body and which defines a front opening of the body through which the tubular part of the nozzle projects out of the body towards the front, while the second sealing barrier is interposed between a front surface of the front collar and a rear face of the cover which surrounds the front opening while the inner peripheral surface of the body is formed on the cover, while a rear surface part of the inner peripheral surface is flared towards the rear and radially faces the outer peripheral surface of the rear collar and while the outer peripheral surfaces of the front and rear collars are cylindrical with a circular outer section, of the same outer diameter, and coaxial.

The rear surface and the front surface of the flange are flat axial surfaces and each sealing joint forming the first sealing barrier and each sealing joint forming the second sealing barrier is accommodated in a groove arranged on the rear surface of the flange and in a groove arranged on the front surface of the flange respectively.

The plug is a piece attached on the nozzle, mounted sealed in the inner volume of the nozzle opposite a rear inner shoulder of the nozzle.

The valve is equipped with a skirt open towards the rear, the skirt of the valve is pierced with through openings that open onto an outer peripheral surface of the valve and the nozzle delimits an inner surface capable of interacting radially with the valve, to the rear of the through openings, when the valve is in the retracted open position.

Each passage arranged in the nozzle extends along an inclined axis which converges towards the front towards a central longitudinal axis of the tubular part, with an angle of inclination in relation to this axis of between 30° and 50°, preferably equal to 40°.

Each passageway in the nozzle has a cross-section in the form of a ring part centered on a central longitudinal axis of the tubular part.

The nozzle comprises a plunger mounted inside the tubular part, the valve is annular in shape and mounted around the plunger and, in the advanced closing position, the valve interacts in a sealed manner with the plunger and with the tubular part to cap the front opening of the tubular part.

According to another aspect, the invention relates to a connection for joining pressurized fluid pipelines, said connection comprising a male coupling element and a female coupling element, at least one of which is as mentioned above.

Such a connection has the same advantages as those mentioned above in relation to the coupling element.

The invention will be better understood and other advantages thereof will become clearer in the light of the following description of four embodiments of a coupling element and a connection according to the invention, given by way of example only and made with reference to the appended drawings in which.

Figure 1:
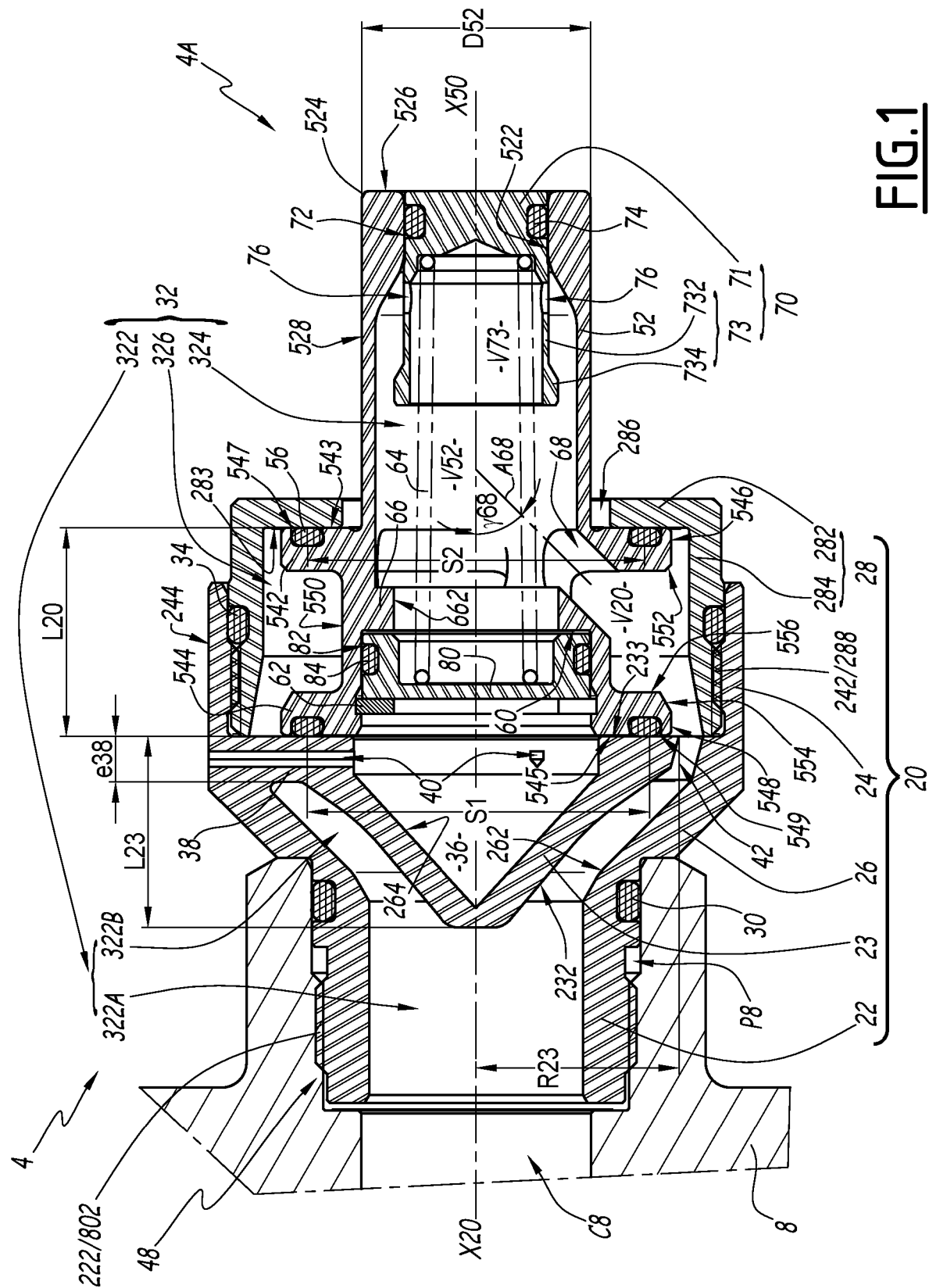
FIG. 1 is a main axial section of a male coupling element according to the invention and belonging to a connection according to the invention.
Figure 2:
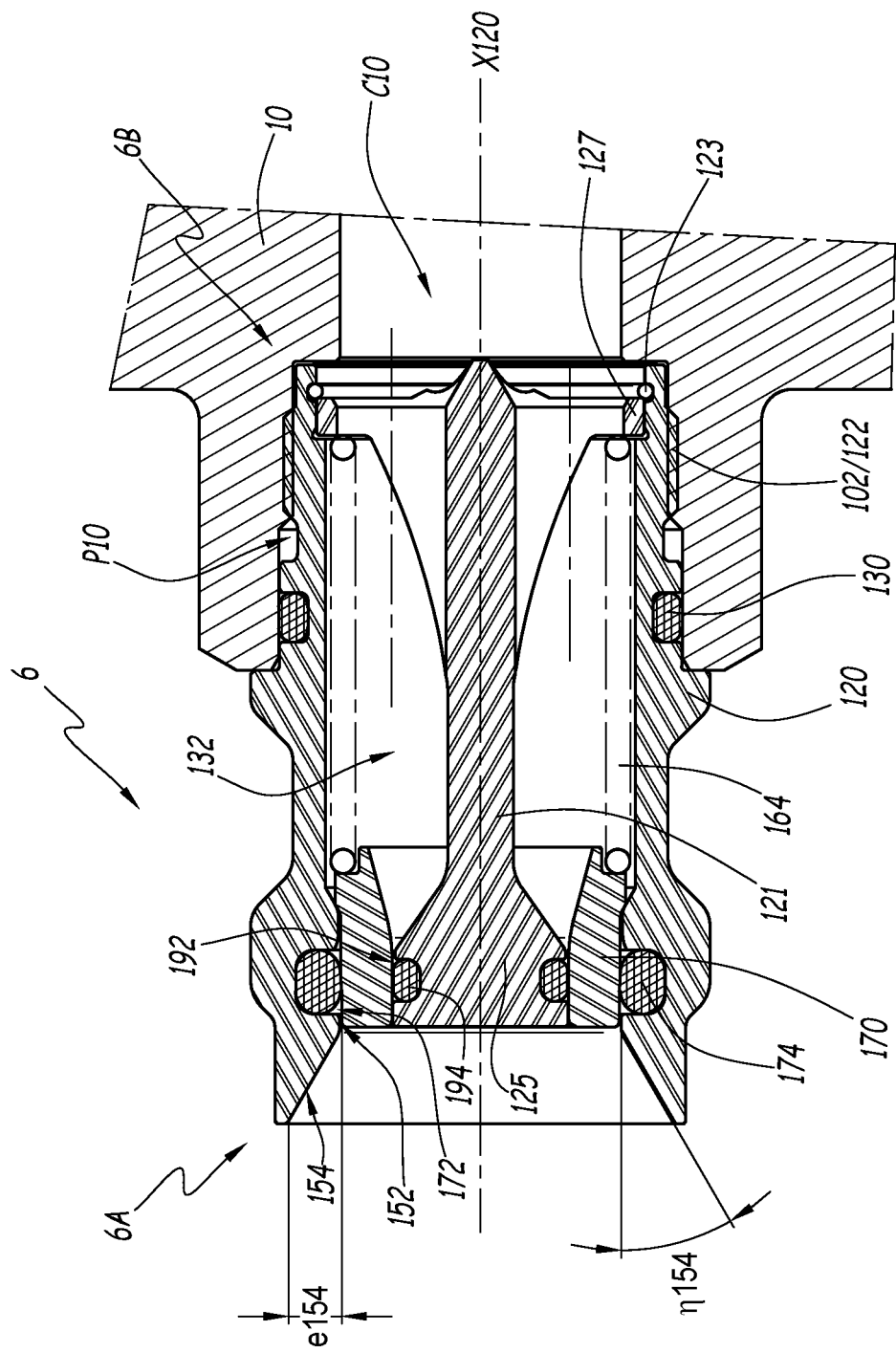
FIG. 2 is a main axial section of a female element complementary to the male element of FIG. 1 and belonging to the same connection.
Figure 3:
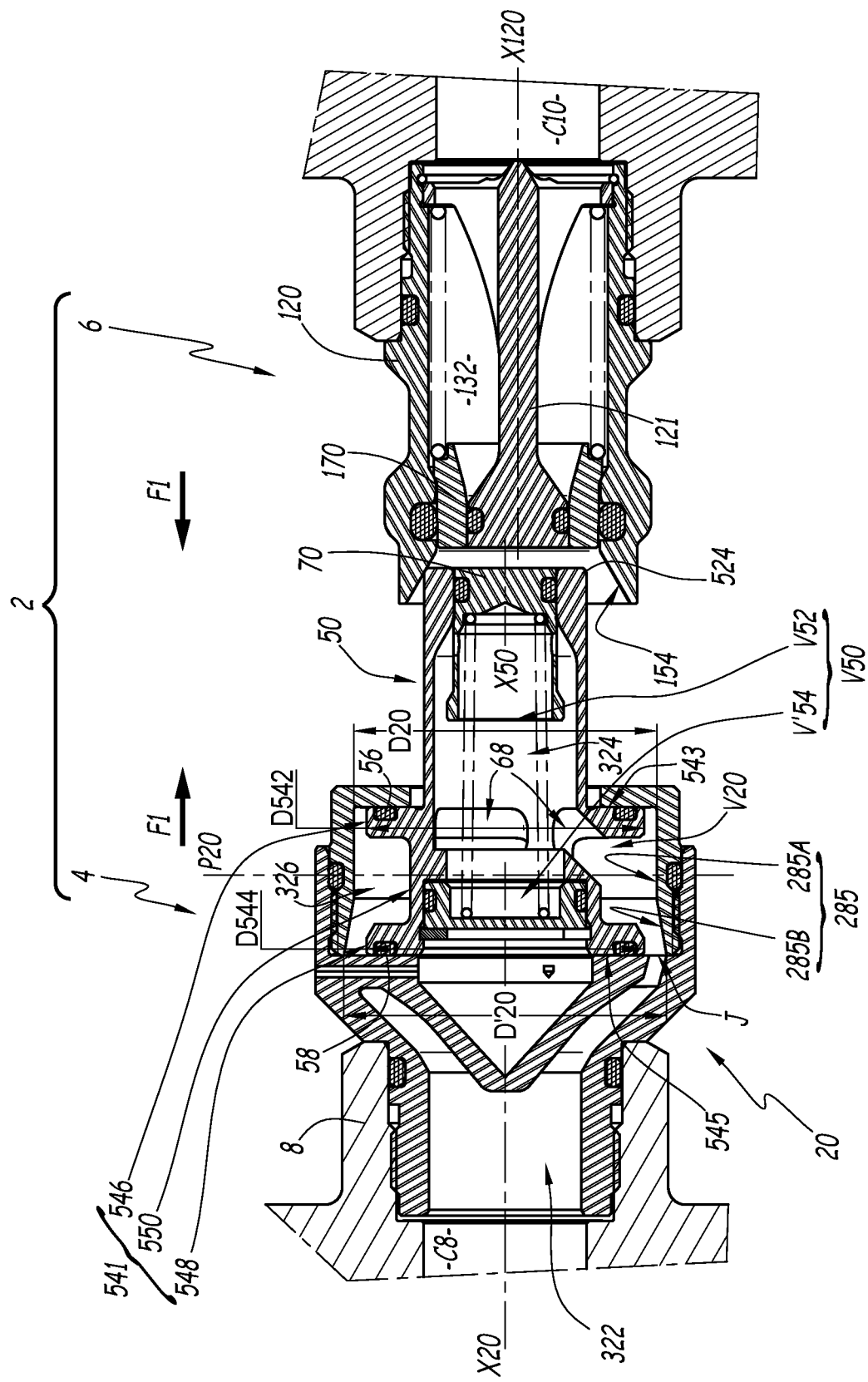
FIG. 3 is a main axial section of the coupling comprising the male and female elements of FIGS. 1 and 2 in the process of being press-fitting.
Figure 4:
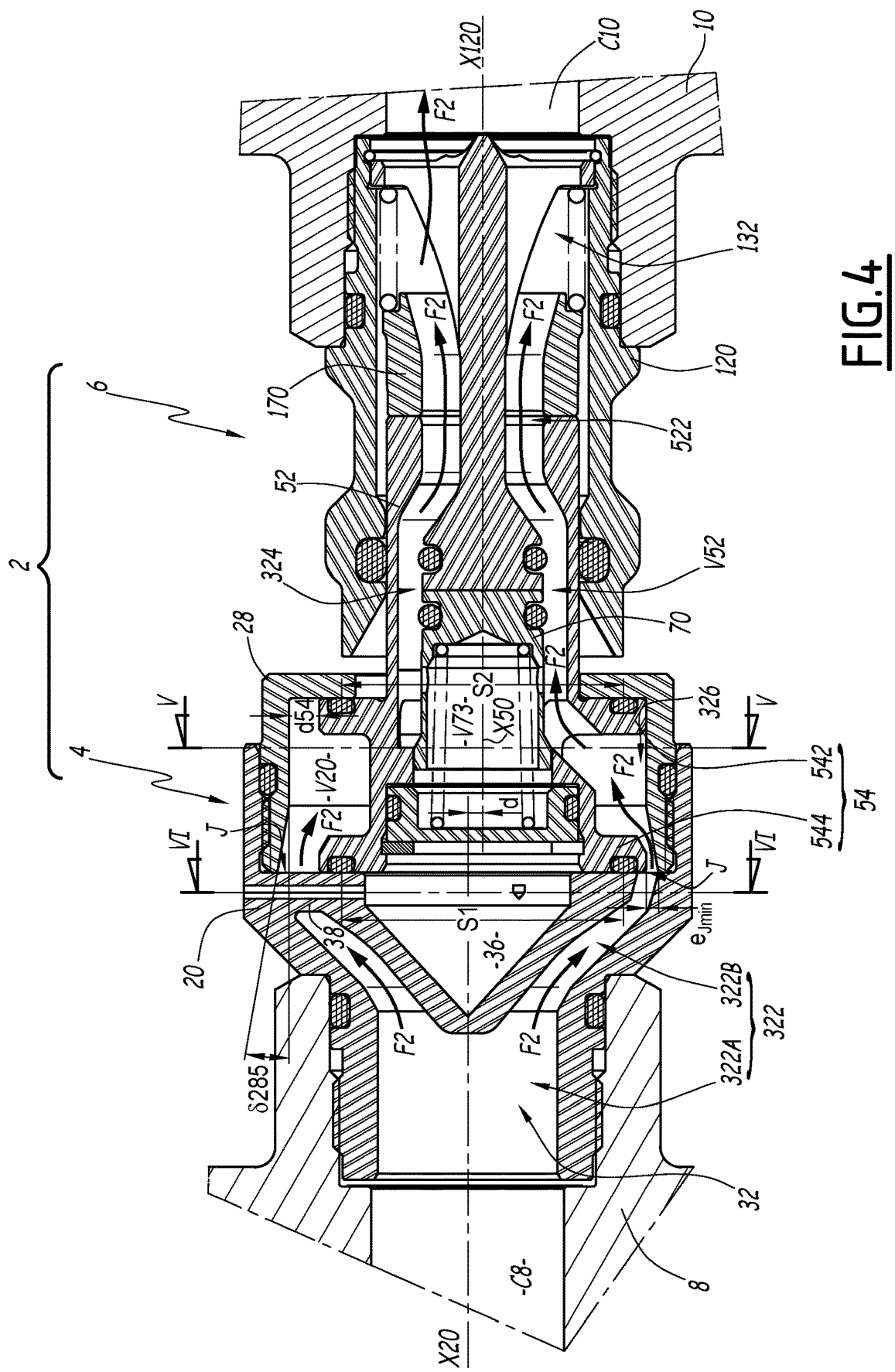
FIG. 4 is a cross-section analogous to FIG. 3 in the coupled configuration of the male and female elements of the connection.
Figure 5:
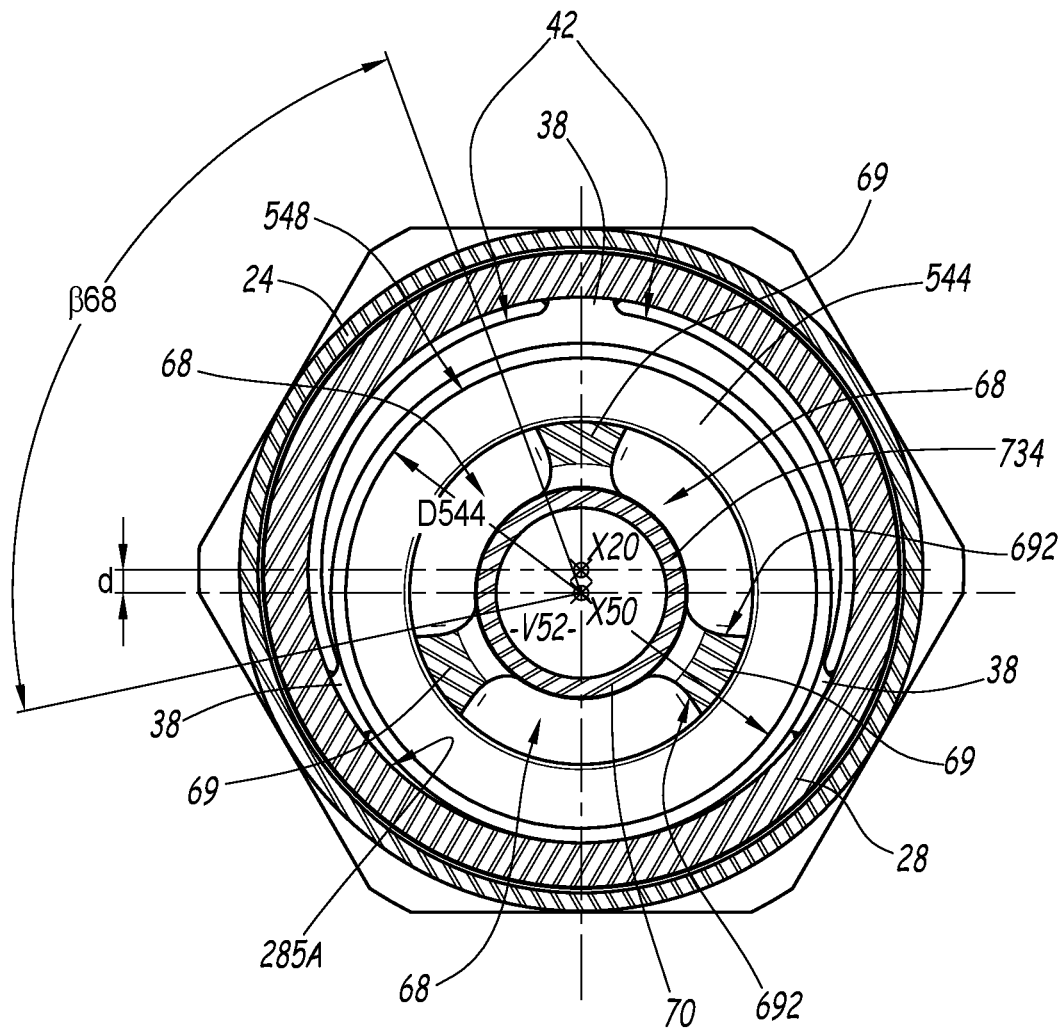
FIG. 5 is a larger scale section along the V-V line in FIG. 4.
Figure 6:
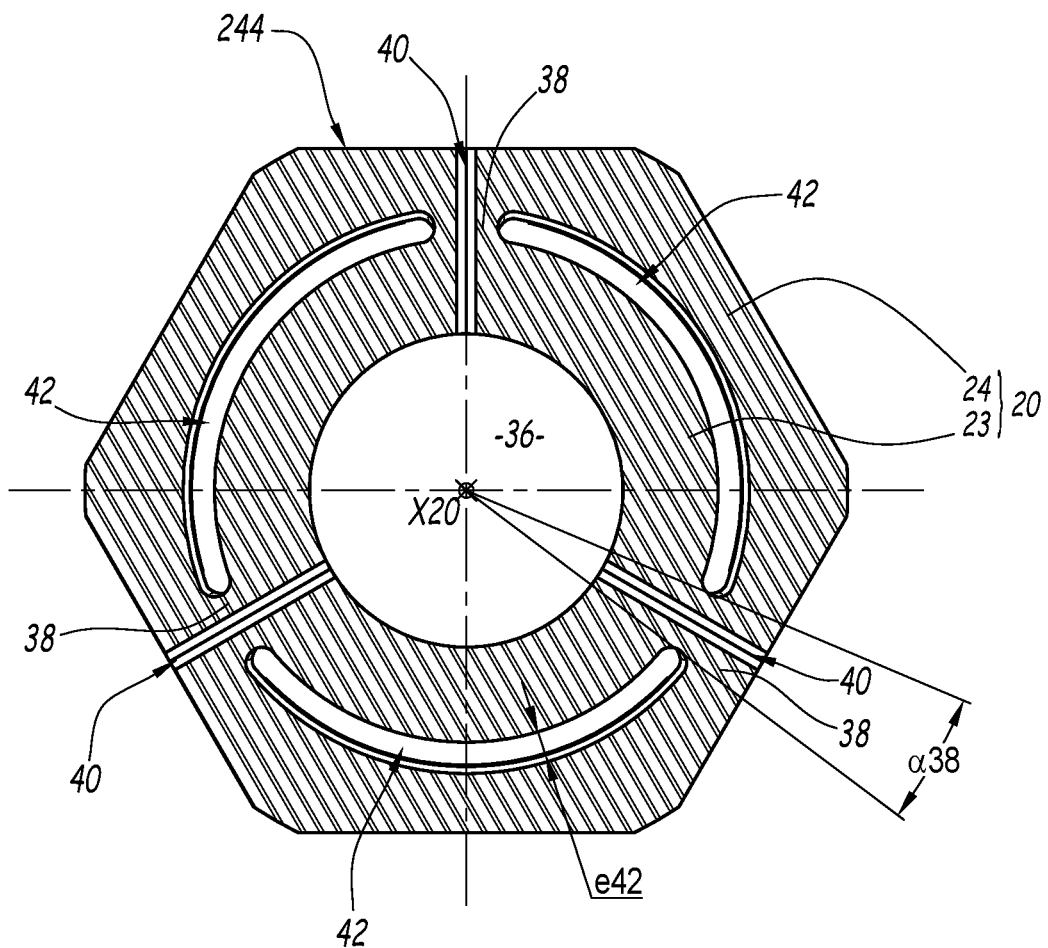
FIG. 6 is a cross-section at the same scale as FIG. 5 along the VI-VI line in FIG. 4.
Figure 7:
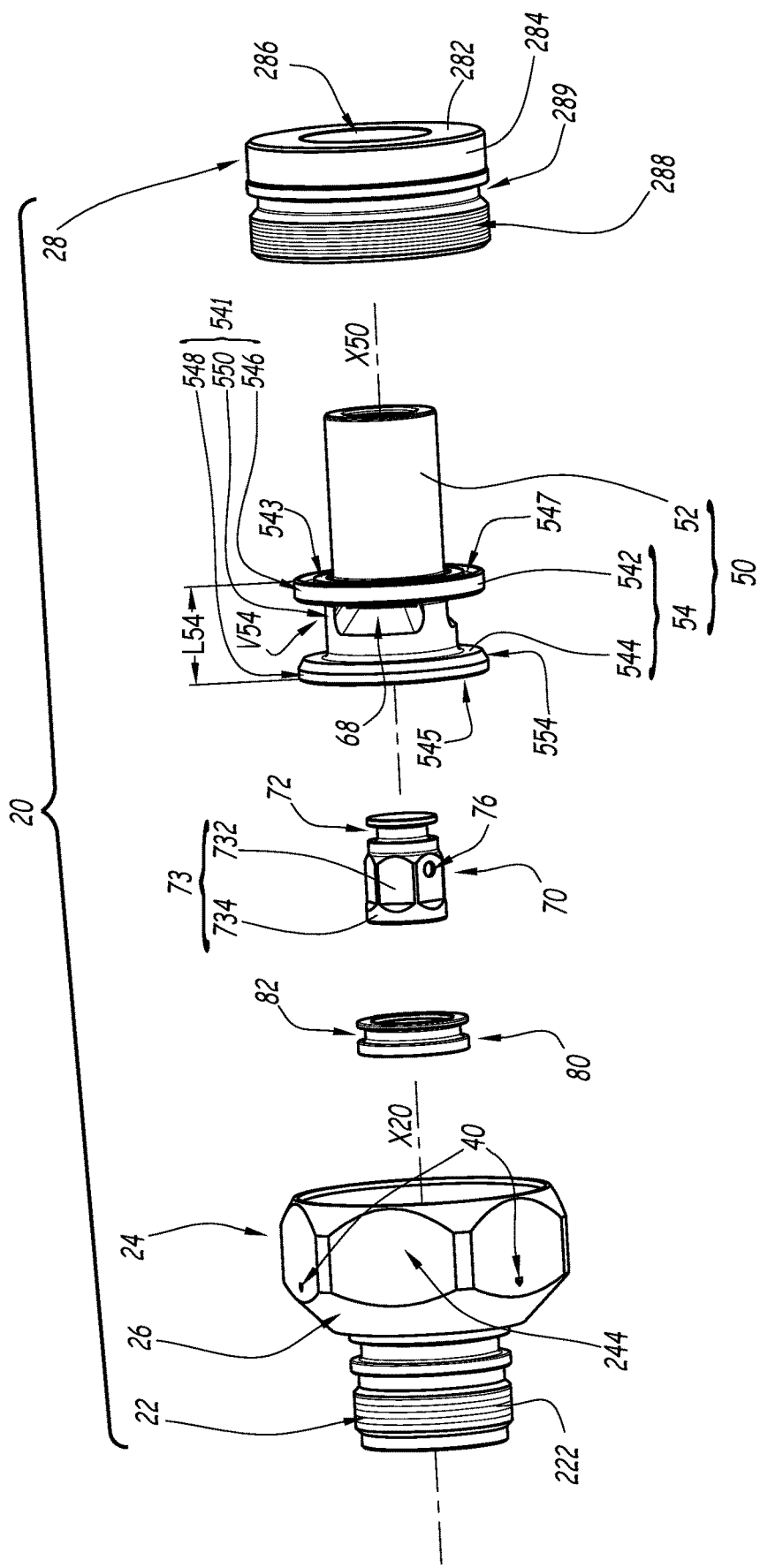
FIG. 7 is an exploded perspective view of some of the elements of the male coupling element shown in the preceding Figures; in this Figure, the sealing joints are omitted, thus showing the receiving grooves of some of these joints.

The fluid coupling 2 shown in FIGS. 1 to 7 comprises a male element 4, shown alone in FIG. 1, and a female element 6, shown alone in FIG. 2, which are intended to fit together in succession from an uncoupled configuration, shown in FIGS. 1 and 2, to a coupling configuration, shown in FIG. 3, and then to a coupled configuration, shown in FIGS. 4 to 6.

The male element 4 is screwed onto a plate 8, which forms a support and in which a pipeline C8 is arranged, in which a pressurized fluid such as a cooling circuit heat transfer fluid circulates.

The male element 4 comprises a body 20 which includes a rear portion 22, a front skirt 24, an intermediate portion 26 that connects the rear portion 22 and the skirt 24, and a cover 28 attached to the skirt 24.

The rear portion 22 is tubular, cylindrical in cross-section and centered on a longitudinal axis X20 of the male body 20. This rear portion 22 is provided with an outer thread 222 intended to be screwed into a corresponding threading 802 provided in a drilling P8 of the plate 8. A sealing joint 30 is interposed between the rear portion 22 and the peripheral wall of the drilling P8.

The axis X20 also constitutes a press-fitting axis for the male element 4.

The male element 4 extends forward from the plate 8.

A front side 4A of the male element 4 is defined as the side of this element facing the female element 6 at the start of the coupling, that is, facing in the insertion direction along the longitudinal axis X20. A rear side 4B of the male element 4 is defined as the side of this element opposite the front side 4A. Here, the rear side 4B of the male element 4 is turned toward the plate 8 and toward the pipeline C8. In the following, the adjective "front" is used to classify an object or surface of the coupling element turned toward the front side of such coupling element, while the adjective "rear" is used to classify an object or surface turned toward the rear side of such coupling element.

A radial or peripheral surface of the male element 4 is defined as an annular surface centered on the axis X20 and parallel to this axis. An axial surface of the male element 4 is defined as a surface perpendicular to the axis X20. An outer surface of the male element 4 is defined as a surface oriented away from the axis X20. An inner surface of the male element 4 is defined as a surface oriented toward the axis X20.

An inner fluid circulation conduit 32 is provided in the male element 4 for fluid to circulation from the pipeline C8 and comprises a first rear portion 322, a second front portion 324, and a third intermediate portion 326 that connects the rear and front portions, 322 and 324.

The rear portion 322 of the inner conduit 32 comprises a first sub-portion 322A, cylindrical in shape with a circular cross-section, centered on the axis X20 and delimited by the rear portion 22 of the body 20, and a second sub-portion 322B, also centered on the axis X20, delimited inside the intermediate portion 26 of the body 20 and diverging towards the front.

The front portion 324 of the inner conduit 32 is located in an inner volume V52 of a tubular part 52 of a nozzle 50, in which a valve 70 is slidably mounted and which passes right through this tubular part.

The intermediate portion 326 of the inner conduit 32 is arranged, radially to the axis X20, inside the skirt 24.

The skirt 24 is provided with an inner threading 242.

In contrast, the cover 28 comprises a bottom 282 and a skirt 284 that extends towards the rear of the element 4, from the bottom 282. The bottom 282 defines a central opening 286 centered on the axis X20. The skirt 284 is provided with an outer thread 288 complementary to the threading 242. The cover 28 is mounted on the front skirt 24, with the interposition of a sealing joint 34 mounted in an outer peripheral groove 289 of the cover 28, by screwing the thread 288 into the threading 242. Thus, the cover 28 constitutes the front part of the body 20 and the hole 286 is a front opening of this body.

The body 20 also comprises includes a cap 23 which is an inner, generally conical shaped part, converging toward the rear of the element 4. The outer peripheral surface of the cap 23 is noted 232.

The inner peripheral surface 262 of the intermediate portion 26 is generally conical and converges toward the rear. The parts 23 and 26 are centered on and radially spaced apart in relation to the axis X20, such that intermediate portion 26 surrounds axis cap 23 and axis rear portion 322 of axis inner conduit 32, which has a disk-shaped cross-section at axis sub-portion 322A within rear portion 22, assumes an annular-shaped cross-section of increasing radius moving forward at second sub-portion 322B within the intermediate portion 26 and around the cap 23. The second sub-portion 322B of the rear portion 322 of the inner conduit 32 is defined between the surfaces 232 and 262.

The inner peripheral surface of the cap 23 is noted 264, which is generally conical and defines, radially and on the rear of the nozzle 50, an inner chamber 36 provided within the male body 20, about the longitudinal axis X20.

The cap 23 is connected to the rest of the body 20, particularly in the junction area between the intermediate portion 26 and the front skirt 24, by three connecting brackets 38 distributed at 120° about the axis X20 and projecting away from the axis X20 from the outer peripheral surface 232 of the cap 23. The connecting brackets 38 may also be referred to as "reinforcing tabs" or "reinforcements" since they contribute positioning the cap 23 within the body 20.

The number and distribution of the connecting brackets 38 are not limiting. The number of connecting tabs is between 1 and 6, in practice, and their distribution is adapted according to their number, preferably evenly around the axis X20.

Each connecting bracket 38 has a vent 40 passing through it. Each vent 40 is straight and extends in a direction radial to the axis X20 from the inner chamber 36 to an outer peripheral surface 244 of the body 20, through the cap 23, a connecting bracket 38 and the intermediate portion 26. Thus, each vent 40 connects the inner chamber 36 to the exterior of the coupling element 4.

The vents 40 are straight with a polygonal cross-section, such as a pentagon shape.

The vents 40 provide equalization of pressure between the inner chamber 36 and the ambient atmosphere around the coupling element 4.

In a variant, only some of the connecting brackets 38 are equipped with a vent 40.

According to another variant, the cross section of the vent(s) 40 is circular or oblong.

The thickness of a connecting bracket 38, measured parallel to the axis X20, is noted e38. Furthermore, the axial length of the cap 23, also measured along the axis X20, is noted L23. The length L23 corresponds to the overall length of the cap 23 and is equal to the projection of the outer peripheral surface 232 on the axis X20. The connecting brackets 38 are thinner along the X20 axis than the inner cap 23 is long along that axis. In other words, the ratio e38/L23 is strictly less than 1. In practice, this ratio may be between 0.15 and 0.40, preferably equal to 0.25.

Here, the connecting brackets 38 extend only around the front part of the inner cap 23. Under these conditions, the second sub-portion 322B of the conduit 32 extends all the way around the cap 23, to the rear of the connecting brackets 38, and, radially, to the axis X20, between surfaces 232 and 262.

As is apparent from FIG. 6, each connecting bracket 38 extends over an angular sector, the angle of which is noted as α38 at the apex about the axis X20. Here, the angle α38 is equal to 13° so that the set of three connecting brackets 38 only slightly limits the cross-sectional area of the inner conduit 32 around the cap 23.

Indeed, a port 42 is provided, between two connecting brackets 38, around the cap 23, in the form of an arc of a circle centered on the axis X20, the radial thickness of which, measured along a direction radial to the axis X20, is noted e42. In practice, the radial thickness e42 is between 10 and 20% of the maximum radius R23 of the cap 23.

The ports 42 constitute passages connect the portions 322 and 326 of the inner conduit 32.

Preferably, the number of ports 42 is equal to the number of connecting brackets 38. In the example, three ports 42 are provided around the cap 23.

The number of ports 42 is not limiting. It is greater than or equal to 1 and, in practice, adapted according to the number of connecting brackets 38.

Given the value of the angle α38, the three connecting brackets 38 only slightly limit the angular amplitude of the ports 42. Here, the ratio between the sum of the angular sectors occupied by the connecting brackets 38, or 39°, and 360° is of the order of 0.11. In practice, this ratio is chosen between 0.05 and 0.2.

The front face of the cap 23 is noted as 233. The front face 233 is also the front face of the connecting lugs 38 because they are flush with the cap 23 on the front.

The rear face of the bottom 282 of the cover 28 is noted 283.

The front 233 and rear 283 faces are annular, flat and perpendicular to the axis X20. They are face to face. In other words, they face each other. They delimit a volume V20 inside the body 20, along the axis X20.

A median plane of the volume 20, perpendicular to the axis X20, parallel to the faces 233 and 283 and located at equal distance from these faces along the axis X20, is noted P20. The plane P20 is radial to the axis X20 and the vents 40 extend parallel to the plane P20.

The axial length of the volume V20 is noted L20, which is the distance between the faces 233 and 283, measured parallel to the axis X20.

The inner peripheral surface of the skirt 284 is noted 285. This surface delimits the volume V20, radially outwardly.

In the absence of the nozzle 50, volume V20 opens forward to the exterior of the coupling element 4 through the opening 286 at the rear face 283, and, towards the rear, into the inner chamber 36 at front face 233. In the absence or presence of the nozzle 50, volume V20 opens into the second sub-portion 322B at the front face 233. The volume V20 thus still communicates fluidly with the rear portion 322 of the inner conduit.

The parts 23, 24 and 26 of the body 20 together constitute a single piece, preferably made by 3D printing and preferably also a single piece with the rear portion 22, as is the case in the example of the Figures. This has the advantage that the geometry of this piece is well defined, so that the dimensional tolerances relating in particular to the rear portion 322 of the conduit 32, the vents 40 and the ports 42 are well controlled.

The nozzle 50 is mounted on the body 20 and, at the front, comprises the hollow tubular part 52, cylindrical in outer shape with a circular section, whose diameter is noted D52 and in the inner volume V52 of which the valve 70 is housed. When the nozzle 50 is partially received in the volume V20, its tubular part 52 protrudes forward from the body 20, through the opening 286.

A longitudinal axis of the nozzle 50 is noted X50, along which the valve 70 is movable within the tubular part 52 and which forms a central axis of the tubular part 52.

At the rear of the tubular part 52, the nozzle 50 comprises a flange 54, the outer peripheral surface of which is noted 541 and which comprises a front collar 542 and a rear collar 544. The front collar 542, the rear collar 544, and the tubular part 52 together constitute a single piece.

Each of the collars 542, 544 has a respective outer peripheral surface 546, 548, which is cylindrical with a circular cross-section, centered on the axis X50, and whose respective outer diameter is noted D542, D544. The outer diameters D542 and D544 are strictly greater than the diameter D52. In other words, the flange 54 is formed as an outer projection in relation to the tubular part 52. The outer peripheral surfaces 546 and 548 are coaxial. In this embodiment, the outer diameters D542 and D544 are equal.

Longitudinally between the collars 542 and 544, the diameter of the flange 54 is reduced, so that around the flange 54 and between these collars, an annular volume V54 is formed that is open radially towards the exterior of the flange 54. The bottom of this annular volume is defined by an outer peripheral surface 550 of the flange 54, whose diameter is smaller than the diameter of the outer peripheral surfaces 546 and 548. The surfaces 546, 548 and 550 together constitute the outer peripheral surface 541 of the flange 54, this peripheral surface 541 being stepped along the axis X50.

The front surface of the collar 542 is noted 543, that is, the surface of this collar 542 that is perpendicular to the axis X50 and faces the tubular part 52.

The rear surface of the collar 544 is noted 545, which is also perpendicular to the axis X50, but facing away from the tubular part 52.

The surfaces 543 and 545 are annular, centered on the axis X50, and flat. The surfaces 543 and 545 are also axial surfaces.

The outer peripheral surface 541 is arranged longitudinally between the front surface 543 and the rear surface 545 of the flange 54.

The axial length of the 54 is noted L54, measured parallel to the axis X50, between the surfaces 543 and 545.

The length L54 to the nearest operating clearance is equal to the length L20.

In the mounted configuration of the nozzle 50, the flange 54 is received in the volume V20 defined by the body 20 with a possibility of movement in relation to the body 20 only in directions parallel to the plane P20, that is, in directions radial to the axis X20. This follows from the respective values of the lengths L20 and L54. Thus, the volume V20 constitutes a housing for receiving the flange 54 in the assembled configuration of the male coupling element 4.

In this configuration, the volume V54 is open towards the inner peripheral surface 285 and towards the part of the volume V20 that is not occupied by the flange 54. The front surface 543 faces the rear surface 283 along the axis X20. The rear surface 545 faces the front face 233 along the axis X20.

The intermediate portion 326 of the inner conduit 32 is radially delimited, around the flange 54, between the inner peripheral surface 285 of the body 20 and the outer peripheral surface 541 of the flange 54.

A first O-ring type of sealing joint 56, such as an elastomer seal, is mounted in a groove 547 in the front surface 543, while a second O-ring type of sealing joint 58, such as an elastomer seal, is mounted in a groove 549 arranged on the rear surface 545. In the mounted configuration of the nozzle 50 on the body 20, the sealing joints 56 and 58 bear against the respective faces 283 and 233 and against the flange 54. The outer peripheral surface 541 of the flange 54 is located within the volume V20, along the axis X20, between the two sealing joints 56, 58.

Thus, a first sealing barrier is formed by the sealing joints 58 interposed between the surfaces 233 and 545 facing each other. The sealing section S1 of this sealing barrier is defined as a fictitious surface of the nozzle 50, axial and facing forward, on which the resultant backward force exerted by the pressure of the fluid contained in the inner conduit 32, is applied, when the valve 70 is in the advanced closing position. This sealing section S1 is delimited by the sealing joint 58. This sealing section S1 is in fact a disk whose radius is equal to the average radius of the sealing joint 58 taken between the center of the tube and the center of the torus forming the sealing joint 58. The track of this section S1 is represented by its diameter in FIGS. 1 and 4.

A second sealing barrier is formed by the sealing joint 56 interposed between the surfaces 543 and 283 facing each other. The sealing section of this sealing barrier is noted S2, which is defined as a fictitious surface of the nozzle 50, axial and turned backwards, on which the resultant forward force exerted by the pressure of the fluid contained in the inner conduit 32 is applied when the valve 70 is in the advanced closing position. This sealing section S2 is delimited by the sealing joint 56. This sealing section S2 is in fact a disk whose radius is equal to the average radius of the sealing joint 56 taken between the center of the tube and the center of the torus forming the sealing joint 56. The track of this section S2 is represented by its diameter in FIGS. 1 and 4.

The grooves 547 and 549 and the joints 56 and 58 have the same geometry. In these conditions, the sealing sections S1 and S2 are identical. In particular, their respective areas have the same value.

The valve 70 is axially movable along the axis X50 in the volume V50 between a first advanced closing position and a second retracted opening position. In the first advanced closing position shown in FIG. 1 and which corresponds to the uncoupled configuration, the valve 70 is in front abutment against the tubular part 52 and closes a front opening 522 of the tubular part 52. In the second retracted open position, shown in FIG. 4 which corresponds to the coupled configuration, the valve 70 is spaced along the axis X50 towards the rear from the front opening 522 which it does not close, to the extent that the valve 70 does not impede the circulation of fluid through the inner conduit 32.

The front portion 324 of the inner conduit 32 is delimited towards the front in the volume V52 by the front opening 522.

A connecting ridge between an annular front face 526 of tubular part 52, which surrounds front opening 522, and the outer peripheral surface 528 thereof, which is of diameter D52 is noted 524.

The valve 70 is provided with an outer peripheral groove 72 in which a sealing joint 74 is received that engages the inner peripheral surface of the tubular part 52 that defines the opening 522, to ensure the sealing of the closure in the configuration of FIG. 1.

A plug 80 is mounted in the nozzle 50, inside the flange 54, from the longitudinal side opposite the tubular part 52. This plug 80 is arranged in an inner volume V'54 of the flange 54 arranged to the rear of the volume V52 and opening onto the rear surface 545. The volumes V52 and V'54 together define the inner volume V50 of the nozzle 50. The plug 80 seals and delimits the front portion 324 of the inner fluid circulation conduit 32, towards the rear. The plug 80 is retained longitudinally in the nozzle 50 between a rear inner shoulder 60 of the nozzle 50, with which it faces, and a stop segment 62, of the circlip type, for example, mounted in the nozzle 50.

The plug 80 is equipped with a peripheral groove 82 in which a sealing joint 84 is housed, which bears against an inner peripheral surface of the nozzle 50. The plug 80 interacts with the nozzle 50 via the sealing joint 84 to seal the rear end of the front portion 324 of the inner conduit 32.

When the plug 80 is mounted on the nozzle 50 and when the nozzle is in place on the body 20, with its flange 54 received in the housing formed by the volume V20, the plug 80 faces the inner chamber 36, in a direction parallel to the axis X20, and seals the inner chamber 36, towards the front.

Thus, the inner chamber 36 is separated from the inner conduit 32 by the cap 23, by the connecting brackets 38, by the flange 54, by the plug 80 and by the first sealing barrier interposed between the surfaces 233 and 545.

A spring 64 is mounted in the inner volume V52. This spring 64 rests on the bottom of a counterbore of the plug 80 and pushes the valve 70 towards its advanced position for closing the opening 522.

The valve 70 comprises a head 71 that carries the groove 72 and a skirt 73 that extends towards the rear from the head 71, which is open towards the rear and defines a volume V73 in which the spring 64 engages. The through holes 76 extend radially through the skirt 73 and put the volume V73 into communication with the part of the inner volume V52 that radially surrounds the skirt 73.

The outer peripheral surface of skirt 73 is stepped and comprises a first front section 732, which has a polygonal profile with a largest dimension equal to the diameter of head 71, and a second rear section 734 with a circular cross-section, of greater diameter than the maximum radial dimension of front section 732, these dimensions being taken radially at axis X50. The through holes 76 open to the first front section 732.

On the other side, an inner collar 66 is provided inside the nozzle 50 at the flange 54 and defines the rear inner shoulder 60, on its rear side. The inner radial surface 662 of the collar 66 is also circular in cross-section and of the same diameter as the rear part 734 of the skirt 73 and defines a housing for receiving this rear part 734, which interacts with the valve 70 when the valve 70 is in its retracted open position shown in FIG. 4. Thus, the collar 66 defines a seat for receiving the valve 70 in the coupled configuration of the male and female elements 4 and 6 of the connection 2. In the vicinity of the inner collar 66, the nozzle 50 is provided with three inclined passages 68 that connect the inner volume V52 of the tubular part 52, thus the inner volume V50 of the nozzle 50, to the annular volume V54 located between the collars 542 and 544, thus to the volume V20 arranged around the flange 54 and to the intermediate portion 326, in the installed configuration of the nozzle 50 on the body 20. The passages 68 open outside the nozzle 50 on the outer peripheral surface 541, that is, along the axis X20, between the sealing barriers formed by the sealing joints 58 and 56 interposed between the surfaces 233 and 545, on the one hand, and 283 and 543, on the other. In this example, the passages 68 open at the level of the surface 550, that is, in the annular volume V54.

The passages 68 open into the inner volume V50 of the nozzle 50 forward of the plug 80 and to the rear of the valve 70, when the latter is in the advanced closing position. The forward portion 324 and the intermediate portion 326 of the inner conduit 32 fluidly communicate through the passages 68.

The three passages 68 are separated by bridges 69. These bridges 69 extend partially, along the axis X50, at the longitudinal level of the front collar 542. The side surfaces 692 of the bridges 69 are concave.

The angular amplitude of a passage 68 about the axis X50 is noted β68. This angular amplitude is between 60° and 100°, preferably equal to 90°.

Each of the passages 68 extends along an axis A68 that converges toward the axis X50 towards the front and forms an angle γ68 therewith, of between 30° and 50°, preferably equal to 40°.

The passages 68 have a section, perpendicular to the axis X50 and visible in FIG. 5, which is in the shape of a ring portion centered on the axis X50. In other words, they extend generally circumferentially about the X50 axis, their circumferential dimension being greater than their radial dimension at the X50 axis and their longitudinal dimension parallel to the X50 axis and visible in FIGS. 1, 2 and 4.

In the example, three passages 68 are provided through the nozzle 50. The number of passages 68 is not limiting. It is greater than or equal to 1 and, in practice, adapted according to the number of bridges 69.

The diameter of the counterbore of the plug 80 is substantially equal to the diameter of the inner radial surface 662 of the collar 6. Preferably the ratio of these diameters is between 0.9 and 1.1. The diameter of the inner radial surface 662 is greater than the diameter of the inner radial surface of the tubular part 52 forward of the passages 68.

The inner peripheral surface 285 includes a circular cylindrical front surface portion 285A, the diameter of which is noted D20, since this diameter constitutes the diameter of the volume V20 on the front of this volume. The inner peripheral surface 285 comprises a rear surface portion 285B that is frustoconical and diverges towards the rear from the portion 285A. The rear surface portion 285B radially faces the rear collar 544; in other words, the 285B and 548 are aligned along the axis X20. The half angle of divergence of the rear surface portion 285B, denoted δ285, is equal to 10°. In practice, this half angle at the apex can be chosen between 5° and 30°.

The maximum diameter of the inner peripheral surface 285 is noted D'20, which is therefore the maximum diameter of the receiving volume V20. This maximum diameter D'20 is measured at the rear end of the rear surface portion 285B.

A possibility of radial movement of the nozzle 50 in relation to the body 20, that is, a possibility of displacement between the axes X20 and X50 that remain parallel, corresponds to the radial clearance existing between the outer peripheral surface 541 of the flange 54 and the inner radial surface that delimits the volume V20, which is here formed by the inner peripheral surface 285.

The diameter D52 of the tubular part 52 and the diameter of the front opening 286 are chosen so as not to limit the travel of the flange 54 in the volume V20.

The difference between the diameter D542 and the diameter D20 is about 9% of the diameter D542. On the other hand, the difference between the diameter D544 and the diameter D'20 is about 14% of the diameter D544. Thus, during maximum radial travel of the nozzle 50 within the volume V20, if the front collar 542 is in contact with the inner peripheral surface 285, as shown in the lower part of FIG. 4, a peripheral radial clearance J remains around the collar 544, in that the outer peripheral surface 548 is not in contact with the inner peripheral surface 285, even locally.

This clearance J is therefore annular. The radial thickness of this clearance J, taken parallel to the plane P20, is variable about the axis X20 and has a non-zero minimum value $e_{J_{min}}$. This is due to the fact that the diameter D'20 is greater than the diameter D20 of the front surface portion 285A, while the diameters D542 and D544 are equal. This allows fluid to pass between the portions 322 and 324 of the inner conduit 32, through the clearance J in the portion 326, around the rear collar 544 both on the side where it is farthest from the inner peripheral surface 285, as shown at the top of FIG. 4, and on the side where it is closest to that surface, as shown at the bottom of this FIG. 4.

Thus, the flange 54 can move, within the volume V20 and parallel to the radial plane P20, with a travel of maximum value d54 equal to the difference between the diameter D20 and the diameter D542. We have a relationship expressed by the following equation:

$$d54 = D20 - D542 \quad \text{(equation 1)}$$

This maximum clearance value is chosen to be greater than or equal to 0.75 mm, preferably equal to 2.1 mm, for a coupling element whose diameter D52 is equal to 15 mm. Thus the ratio d54/D52 is between 0.1 and 0.16, preferably equal to 0.14.

The front collar 542, on the side of the annular volume V54, has a truncated edge which defines a truncated conical chamfer 552 whose half angle at the apex is equal to 45°. On the other hand, the rear collar 544 has a truncated edge, on the side of the annular volume V54, which defines a chamfer 554 whose half-angle at the apex in relation to the axis X50 is equal to 30°. This chamfer 554 connects the outer peripheral surface 548 and the front annular surface 556 of the rear collar 544. The chamfer 554 has a length parallel to the axis X50 and a radial width perpendicular to that axis greater than the respective axial length and radial width of chamfer 552. The chamfer 554 facilitates fluid circulation around the rear collar 544, minimizing the pressure drops.

The female element 6 of the connection is threaded into a plate 10 that defines a fluid circulation channel C10.

The female element 6 comprises a one-piece body 120 provided with an outer thread 122 screwed into a correspondingly shaped threading 102 located on the periphery of a drilling P10 arranged in the plate 10. A seal 130 is interposed between the body 120 and the drilling P10.

The body 120 extends along a longitudinal axis X120. A front side 6A of the female coupling element 6 is defined, which is oriented towards the element 4 at the start of coupling, that is, turned in the direction of press-fitting along the longitudinal axis X120, and a rear side 6B of this coupling element, which is oriented opposite the front side 6A and is turned towards the pipeline C10.

A stationary plunger 121 is fixed longitudinally in the tubular body 120 by means of a stop segment 123 formed by a snap ring.

A valve 170 is installed around the plunger 121 and surrounds a front head 125 of the plunger in a configuration where the valve 170 caps an inner fluid circulation conduit 132 within the female element of the coupling. The valve 170 may also be referred to as a "spool".

A joint 174 is mounted in a groove 172 arranged on an inner peripheral surface of the body 120 around the head 125, while another joint 194 is mounted in an outer peripheral groove 192 of the head 125. When the valve 170 caps the inner conduit 132, the joints 174 and 194 abut a respective outer peripheral surface and an inner peripheral surface of this valve.

A spring 164 is arranged in the inner volume of the body 120 and bears against a foot 127 of the plunger 121 and pushes the valve 170 towards its position of closing the conduit 132.

The valve 170 is longitudinally mobile, along the axis X20, between the configuration, shown in FIGS. 2 and 3, where it is in an advanced closing position and closes a front annular opening 152 of the body 120, and a retracted opening position, shown in FIG. 4, where it allows the passage of fluid in the inner conduit 132.

The front end of the body 120 forms a mouth diverging towards the front, with a frustoconical inner surface 154 having a half angle at the apex η154 of between 20° and 45°, preferably equal to 30°. The truncated conical surface 154 is arranged forward of the valve 170 in the advanced closing position.

The radial thickness of the surface 154 is noted e154, this thickness being measured along a direction radial to the axis X120. This radial thickness e154 is chosen to be greater than the maximum value d54 of the flange clearance 54 in the volume V20. In other words, we have a relationship expressed by the following equation:

$$e154 > d54 \quad \text{(equation 2)}$$

During coupling, the male and female elements 4 and 6 are brought together by approximately aligning the axes X20 and X120 with their respective bodies 20 and 120. It is assumed that the flange 54 of the nozzle 50 is then centered in the volume V20, that is, the axes X20 and X50 are aligned. However, this is not mandatory.

In the event of misalignment between the axis X50 and the axis X120, the edge 524 comes into contact with the frustoconical surface 154 of the mouth of the female body 120 and the progression of the male and female elements towards each other, in an approach or press-fitting direction parallel to the axis X20 and shown by the arrows F1 in FIG. 3, causes the edge 524 to slide along the surface 154 so as to align the axes X50 and X120, even though the axes X20 and X120 remain parallel but not aligned. This is made possible by a displacement of the nozzle 50 in relation to the body 20, by means of the deflection of the flange 54 within the volume V20, that is, a displacement parallel to the radial plane P20, which takes place, in the example of the Figures, during the passage from the configuration of FIG. 3 to the configuration of FIG. 4. This deflection movement occurs, over its entire amplitude, with a tight sliding contact between the front face 233 of the body 20 and the rear surface 545 of the flange 54, through the intermediary of the joint 58, and with a tight sliding contact between the rear face 283 of the body 20 and the front surface 543 of the flange 54, through the intermediary of the joint 56. The sealing joint 58 thus provides the sealing function between the flange 54 and the front face 233 during the deflection movement of the flange 54 in the body 20. The sealing joint 56 thus provides the sealing function between the flange 54 and the rear face 283 during the deflection movement of the flange 54 in the body 20.

During this deflection, and in contrast to the equipment of U.S. Pat. No. 3,508,580, even if the inner conduit 32 of the male element 4 is filled with pressurized fluid such as freon at a pressure of 15 bar, the displacement forces of the collar 54 in the volume V20 do not need to counteract the forces generated by the pressure of the fluid in the inner conduit 32. In fact, the effects of the pressure differences that apply to the nozzle 50 on either side of the first sealing barrier, interposed between the surfaces 233 and 545, and on either side of the second sealing barrier, interposed between the surfaces 283 and 543, tend to balance each other, that is, tend to cancel each other out, because the sealing sections S1 and S2 respectively delimited by the first and second sealing barriers are of equal areas, the respective areas of which are noted A1 and A2.

When the sealing sections have similar areas, in particular areas that differ by less than 15%, that is, when the A2/A12 ratio of the areas of the sealing sections S2 and S1 is between 0.85 and 1.15, the effects of the pressure differences that apply to the nozzle 50 on either side of the first and second sealing barriers are greatly reduced. Particularly satisfactory results are obtained when the A2/A1 ratio is between 0.95 and 1.05, with the value 1 remaining preferable for this ratio.

Thus, when the valve 70 is in the advanced closed position where it caps the male coupling element 4, the movement of the nozzle 50 in relation to the body 20 can take place without having to overcome significant pressure forces. This makes it possible to reduce the forces exerted by the edge 524 on the inner surface 154 and prevent localized caulking of the inner surface 154 and the edge 524. The force exerted to couple the elements 4 and 6 is reduced, while the seal is permanently assured.

The pressure balance at the flange 54 also results from the fact that both sealing barriers seal with the same pressure difference, that is, with the pressure difference between the inner pressure at the volume V20 and the outer atmospheric pressure, since the inner chamber 36 is at the outer atmospheric pressure through the vents 40.

The vents makes it possible to maintain the inner chamber 36 at a pressure close to or equal to atmospheric pressure in the event of leakage through the first sealing barrier. In practice, the vents 40 are only useful in the event of leakage through the first sealing barrier since, upon assembly, the sealing chamber 36 is at the same atmospheric pressure as the exterior of the coupling element 4

When the axis X50 is aligned with the axis X120, the front face of the head 71 comes into contact with the front face of the head 125 and the front face of the valve 170 comes into contact with the front face 526 of the tubular part 52. The continuation of the longitudinal press-fitting movement parallel to the longitudinal axis X20, in the press-fitting direction of the arrows F1, causes the valves 70 and 170 to move towards their respective open positions, against the action of the springs 64 and 164. This movement causes the rear part 734 of the skirt 73 of the valve 70 to move into the complementary shaped seat defined by the inner radial surface 662 of the inner collar 66. The through holes 76 make it possible to evacuate the pressurized fluid from the volume V73, thus preventing a pressure increase in in this volume from blocking or slowing the movement of the valve 70 toward its open position. The inner radial surface 662 assists in guiding the valve 70 at the end of its displacement course, upon coupling, from its closed position to its open position.

In the coupled configuration, the connection 2 joins the two pipelines C8 and C10. Fluid can then circulate between the pipelines C8 and C10, through the inner conduits 32 and 132, as shown by the arrows F2 in FIG. 4. In particular, pressurized fluid coming from the pipeline C8 flows through the cylindrical and axial sub-portion 322A of the rear portion 322 of inner conduit 32, and then in the diverging annular sub-portion 322B of the portion 322, until it passes through the ports 42 and enters longitudinally into the part of the volume V20 that surrounds the flange 54, which part constitutes the intermediate portion 326 of inner conduit 32. The fluid exits the intermediate portion 326 through the passages 68, entering the forward portion 324 of the conduit 32 in the tubular part 52, where it flows around the valve 70 and the forward part of the plunger 121, until it passes through the valve 170 and exits into the conduit 132 of the female coupling element 6, and then reaches the pipeline C10 through the foot 127 of the plunger 121.

The coupled configuration of the coupling 2, which is shown in FIGS. 4 to 6, is achieved by an essentially longitudinal displacement of the plates 8 and 10 towards each other, while a possible misalignment between the axes X20 and X120 at the start of press-fitting movement is tolerated. In fact, from the start of coupling and in the coupled position of the elements 4 and 6, a radial offset d can exist between the axes X20 and X120, without this disturbing the passage from the uncoupled configuration to the coupled configuration, or the coupling operation.

Since the thickness e154 is greater than the maximum value d54 of the deflection, the front part of the nozzle 50 is likely to be opposite the truncated conical surface 154 of the mouth of the female element during the relative approach movement of the plates 8 and 10. This secures the coupling operations of the elements 4 and 6.

When the misalignment between the axes X20 and X120 is maximum at the start of coupling, the nozzle 50 moves perpendicularly to the axis X20, within the body 20, until the front collar 542 comes to rest against the inner peripheral surface 285 of the male body defined by the cover 28. In this position shown in FIG. 4, fluid can pass through the three ports 42 and the pressure drops generated are minimized due to the frustoconical nature of the rear surface portion 285B and the existence of the chamfer 554.

In the example of the Figures, the amplitude of the radial offset d in the configuration of FIGS. 4 to 6 is equal to half of the maximum value d54 of deflection because the flange 54 rests against the inner peripheral surface 285 of the housing formed by the volume V20. This is a limiting case. In practice, the magnitude of the radial offset d is less than or equal to half the maximum value d54.

The first rear portion 322, the second front portion 324 and the third intermediate portion 326 are in permanent fluid communication, whether in the uncoupled configuration, in the coupled configuration, or during coupling of the coupling element 4.

To uncouple the connection 2, the elements 4 and 6 are moved away along the longitudinal axis X20 in an uncoupling direction opposite to the arrows F1, which causes the valves 70 and 170 to close and the nozzle 50 to disengage from the body 120. The radial position of the nozzle 50 in the inner volume V20 is unchanged during this uncoupling phase.

Figure 8:
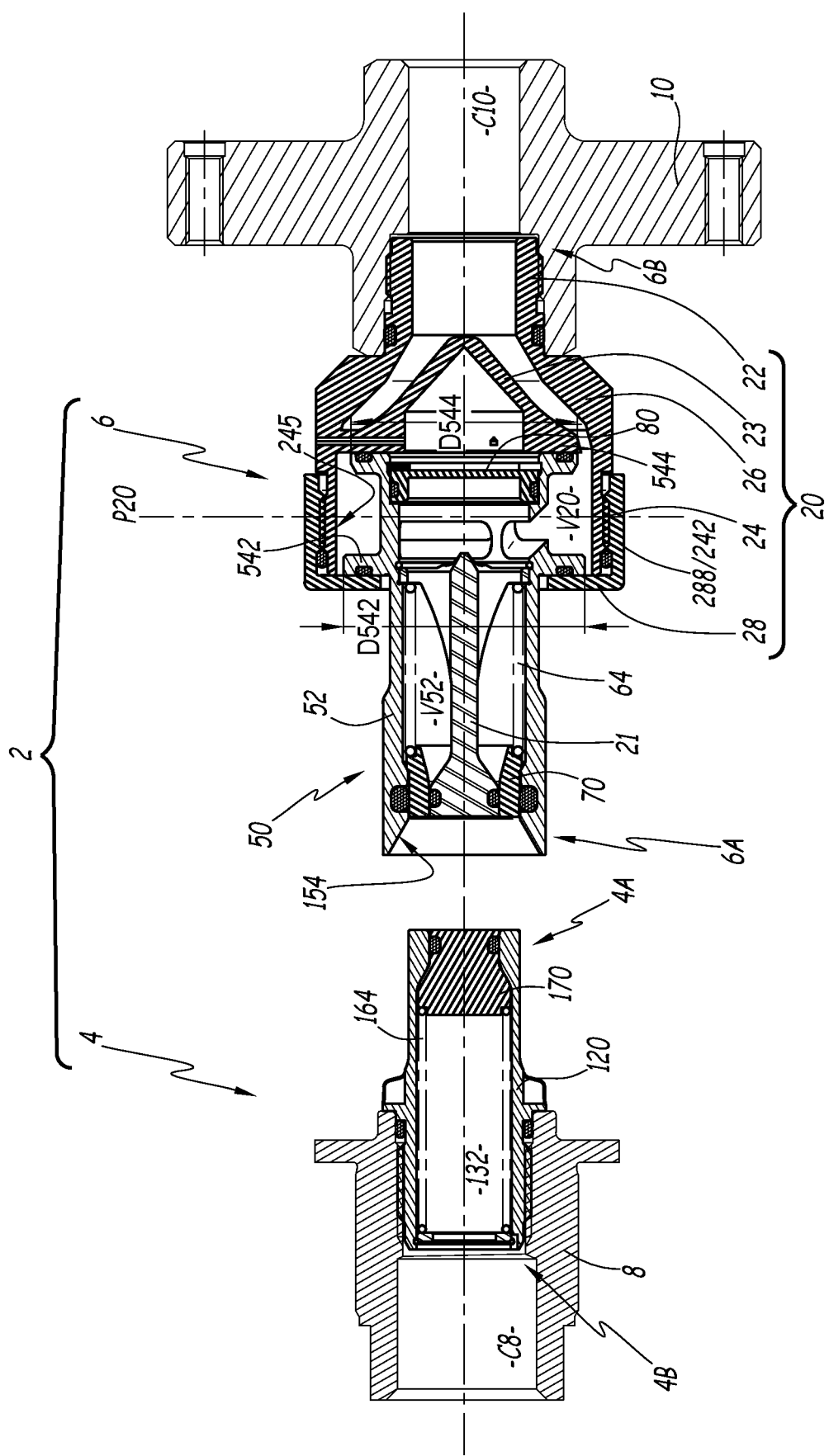
FIG. 8 is a main longitudinal section of a connection according to a second embodiment in a decoupled configuration, incorporating a female coupling element according to the invention.

In the second to fourth embodiments shown in FIG. 8 and following, the elements similar to those in the first embodiment have the same references. If a reference is used in one of these Figures without being mentioned in the description, it corresponds to the element bearing the same reference in the first embodiment. Conversely, if a reference is used in the description without being shown in FIGS. 8 to 11, it corresponds to the element bearing the same reference as in the first embodiment.

In the following, primarily what distinguishes the second through fourth embodiments from the first embodiment is described.

Figure 9:
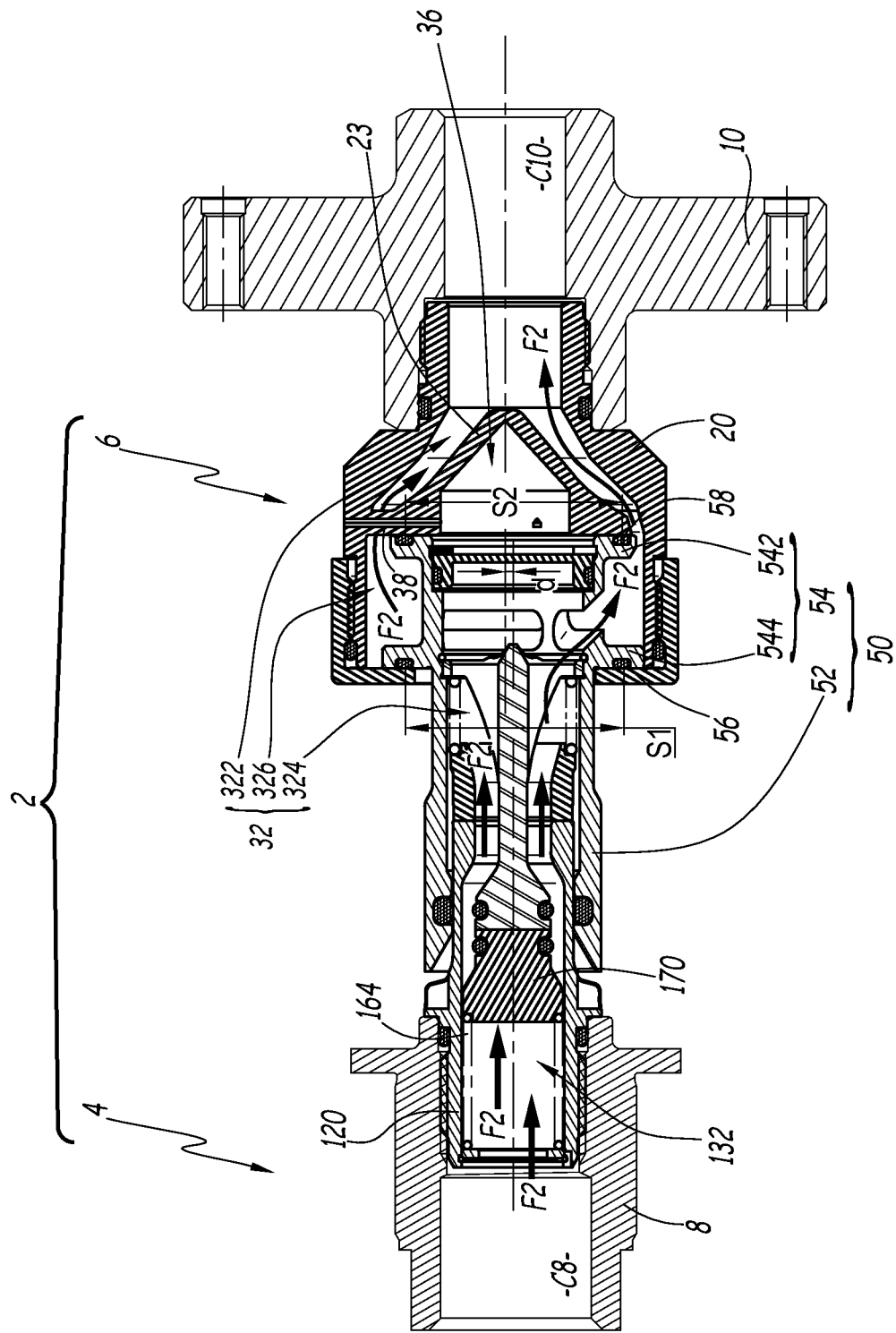
FIG. 9 is a cross-section analogous to FIG. 8 in a coupled configuration of the connection.

In the second embodiment of FIGS. 8 and 9, the male element 4 is conventional, with a body 120 mounted on a support 8 that defines a pipeline C8 and a valve 170 sliding inside the body 120 and pushed into the closed position by a spring 164. The male element 4 complements the female element 6.

The female element 6 comprises an nozzle 50 equipped with two collars 542 and 544 that belong to a flange 54 arranged in an inner volume V20 of the body 20. In this embodiment, the invention is implemented in the female element 6 of the coupling.

The female element also comprises a valve 70, which is annular in shape and slidably mounted around a plunger 21 of the nozzle 50, in the inner volume V52 of a front tubular part 52 of the nozzle 50. The plunger 21 is mounted in the inner volume V52 of the tubular part 52, without the possibility of axial movement in relation to the tubular part 52. In the advanced closed position, the valve 70 interacts in a sealed way with the plunger 21 and with the tubular part 52 to close the front opening 522 of the tubular part 52. The frustoconical surface 154 is arranged in front of the valve 70 in the advanced closed position. In the retracted open position, the valve 70 allows fluid to pass into the inner conduit 32. A spring 64 pushes the valve 70 back to its closed position.

Here, the cover 28 is screwed not to the inside of the skirt 24 but to the outside thereof. For this purpose, the cover 28 is provided with an inner threading 288, while the skirt 24 is provided with an outer thread 242. The inner peripheral surface of the body 20 delimiting the inner volume V20 towards the exterior, defined as in the first embodiment, is thus formed here by the inner radial surface 245 of the skirt 24, which has a constant diameter along its entire length.

Furthermore, in this example, the outer diameters D542 and D544 of the two collars 542 and 544 are different. Indeed, the outer diameter D544 of the rear collar 544 is smaller than the outer diameter D542 of the front collar 542, in order to free as much space as possible around the collar 544 for the passage of the fluid in the coupled configuration of the connection 2, whatever the position of the nozzle 50 in the inner volume V20, so that the fluid can flow int a pipeline C10 defined by a support 10 on which the body 20 of the female element 6 is screwed.

As in the first embodiment, the two joints 56 and 58 arranged at the interface between the flange 54 and the body 20 define two sealing barriers whose sealing sections S1 and S2 have identical areas A1 and A2. As in the first embodiment, the deflection movement of the nozzle 50 in relation to the body 20 occurs with the sliding sealing contact between the front face defined by the cap 23 and the rear surface of the flange 54, through the joint 58, and with the sliding sealing contact between the rear face of the cover 28 and the front surface of the flange 54, through the joint 56. Also as in the first embodiment, the axial thickness of the connecting brackets 38 is less than the axial length of the cap 23 that defines the inner chamber 36.

Figure 10:
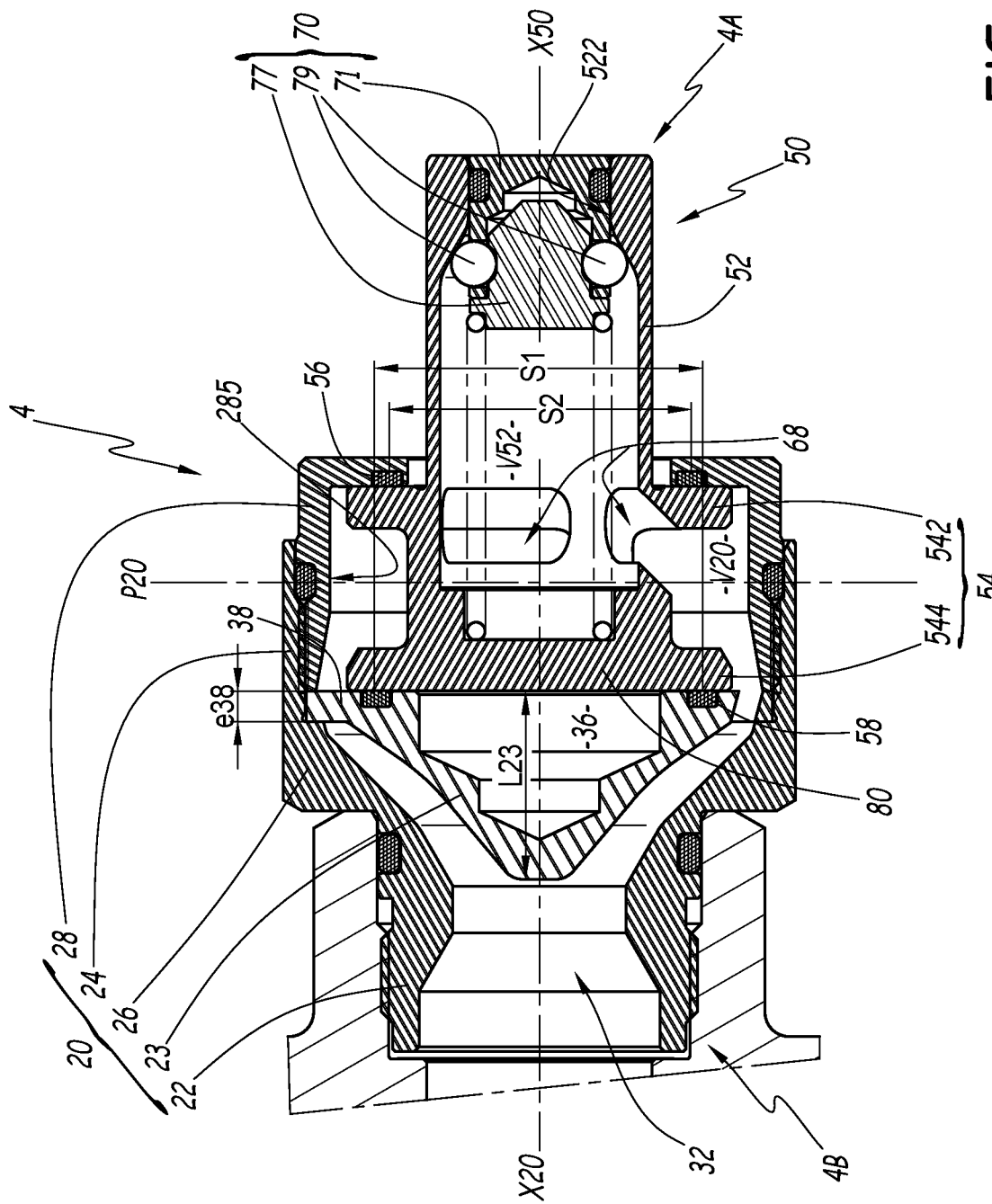
FIG. 10 is a main axial cross-section of a male coupling element according to a third embodiment of the invention.

In the third embodiment shown in FIG. 10, the plug 80 is integral with the rear collar 544 and thus caps the second portion 324 of the inner conduit 32 at the rear.

In addition, the plug 70 is tripartite, with a head 71, a rear part 77 and balls 79, so as to be mounted in the volume V52 from the front of the nozzle 50 through the front opening 522 of the tubular part 52. Use was made here of the technical teaching of EP-A-3 301 341, the technical teaching of which is incorporated by reference.

Here, the cap 23 and the connecting brackets 38 together constitute a one-piece part but are not integral with the rest of the body 20, but are attached to the one-piece constituting the parts 22, 24 and 26 at the junction between the parts 24 and 26. In addition, no vent is provided connecting the inner chamber 36 to the exterior of the coupling element 4, assuming that leakage through the first sealing barrier is non-existent.

In this embodiment, the tapered shape of the inner cap 23 is optional. Indeed, the inner chamber 36 can be delimited between the front face 233 of the cap 23, which is then disc-shaped around the axis X20 and which faces the plug 80 axially. This inner chamber 36 remains separated from the inner conduit 32 by the cap 23, by the flange 54, by the plug 80 and by the first sealing barrier 58 of the sealing section S1.

In this embodiment, the sealing sections S1 and S2 are not of equal area, with the sealing section S2 delimited by the sealing joint 56 at the front of the flange 54 having an area A2 less than the area A1 of the sealing section S1 delimited by the sealing joint 58 at the rear of the flange 54. The difference in these sealing sections S1 and S2, that is, in practice, the difference in the areas A1 and A2 of the fictitious disc-shaped axial surfaces surrounded by the joints 56 and 58, is chosen to be sufficiently small to remain compatible with relatively modest forces to be provided to move the flange 54 formed by the collars 542 and 544 within the volume V20, parallel to the radial plane P20 during coupling.

In practice, in this embodiment as in the others, the maximum misalignment force to be provided can be set at about 30 daN. The maximum force to be exerted depends not only on the sealing sections S1 and S2 but also on the pressure of the fluid inside the inner conduit 32 of the coupling element 4. In the example shown in FIG. 10, the difference in sealing sections is about 7%, which gives good results. In practice, satisfactory results are obtained for a S2/S1 ratio greater than or equal to 0.85, that is, a difference in sealing sections of 15%.

In a variant of the invention not shown, the sealing section S1 at the rear of the flange 54 has an area A1 less than the area A2 of the sealing section S2 at the front of the flange 54. Also in this case, in practice, the A1/A2 ratio is chosen to be greater than or equal to 0.85.

In this third embodiment, the seals 56 and 58 are arranged in grooves in the cover 28 and in the cap 23, respectively, that is, on parts of the body 20, and not on parts of the flange 54, as in the other embodiments. In addition, the joints 56 and 58 are not O-rings, as in the other embodiments, but are flat joints with a rectangular cross-section.

Figure 11:
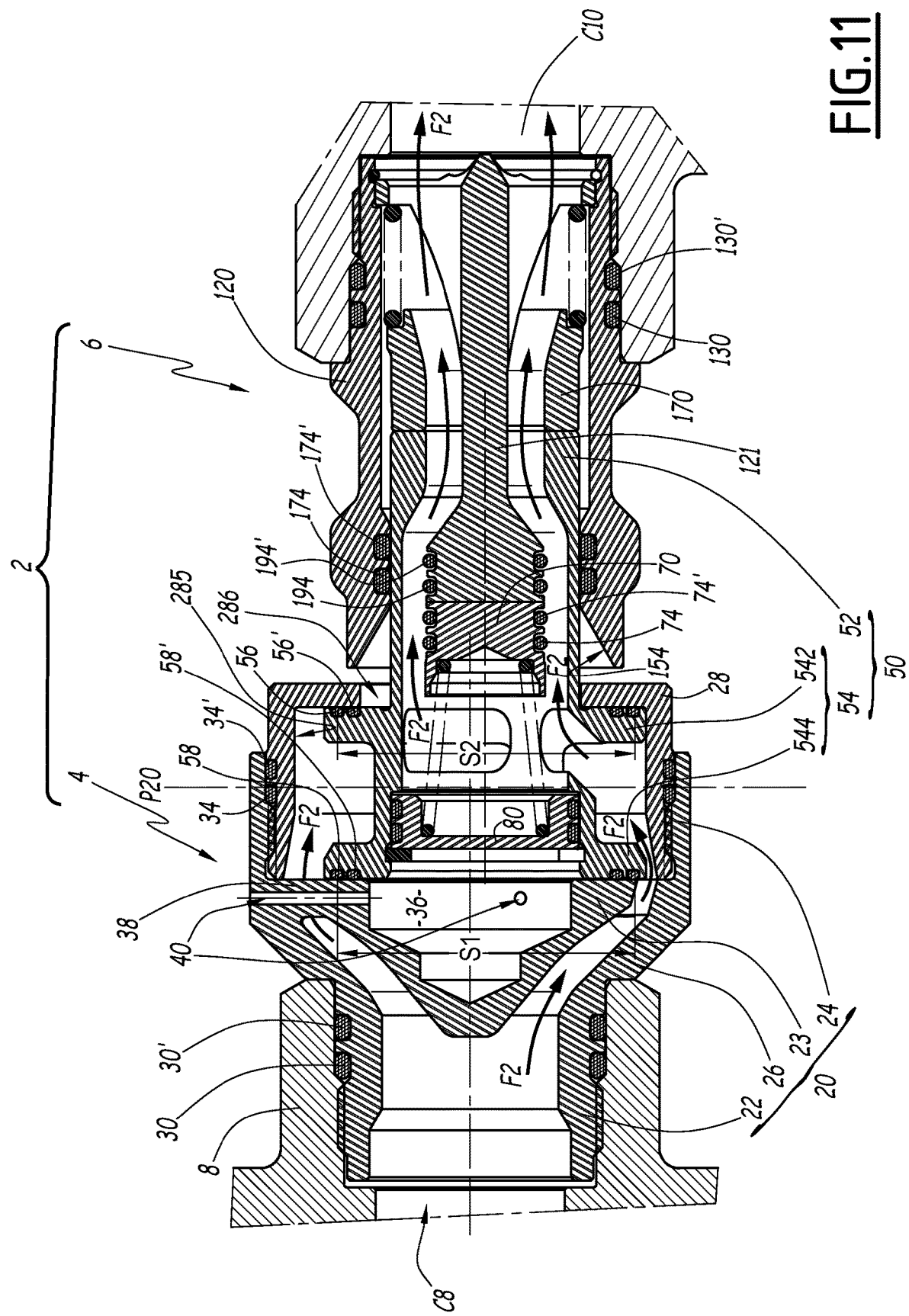
FIG. 11 is a cross-section analogous to FIG. 4 for a coupling according to a fourth embodiment of the invention.

In the fourth embodiment shown in FIG. 11, the vents 40 that connect the inner chamber 36 to the outside of the male element 4 are cylindrical with a circular cross-section and not polygonal in cross-section.

In addition, the individual sealing joints are arranged in pairs to create a first and second double sealing barrier. This is particularly the case for the joints 56 and 56' arranged in two concentric grooves formed on the front collar 542 and, for the joints 58 and 58', arranged in two concentric grooves formed on the rear collar 544, the collars 542 and 544 constituting the flange 54 as in the first embodiment. In this case, the first sealing barrier is formed by the two joints 58 and 58' that both contact the flange 54 and the front face 233 of the body 20 and the second sealing barrier is formed by the two joints 56 and 56' that both contact the flange 54 and the rear face 283 of the body 20. In this case, the sealing sections S1 and S2 associated with the two sealing barriers are delimited by the outermost sealing joints, that is, by the sealing joints 56 and 58 having a larger diameter than the sealing joints 56' and 58' and thus delimiting the inner conduit 32.

The joints 30, 34, 72, 130, 174 and 194 of the first embodiment are replaced here by pairs of joints 30 and 30', 34 and 34', 74 and 74', 130 and 130', 174 and 174', 194 and 194'.

In a variant, only some of these joints are replaced by pairs of joints.

According to one variant, not shown and applicable to all embodiments, the flange 54 does not have two collars 542 and 544 between which a peripheral volume V54 is defined, but has a constant outer diameter along its entire length.

According to another variant, not shown and applicable to all embodiments, the flange has two adjacent collars of different diameters, without a volume comparable to the volume V54 being provided between them.

According to another variant, not shown and applicable to all embodiments, each of the passages 68 extends along an axis A68 that is radial to the axis X50.

According to another variant, not shown and applicable to all embodiments, the cap 23 is centered on an axis that is parallel to and offset from the central longitudinal axis X20.

Regardless of the embodiment of the invention, the invention has the advantage of reducing a pressure imbalance applied to the nozzle 50, at its flange 54, which facilitates the movements of the flange 54 within the volume V20 parallel to the radial plane P20, including when a pressurized fluid is present in the inner conduit 32, in the valve 70 closure configuration. The sealing barriers that isolate the volume V20 for receiving the flange 54 from the atmospheric pressure, on the front side of the nozzle 50 and on the side of the sealing chamber 36, respectively, make it possible to balance or compensate to a large extent for the forces exerted on the nozzle 50 by the pressurized fluid present in the inner conduit 32, which makes it possible to optimize the coupling forces.

The geometry of the various passages formed in particular by the ports 42 and the passages 68 as well as the geometry of the connecting brackets 38 and the bridges 69 is optimized to limit pressure losses.

When present, the vents 40 ensure that the inner chamber 36 is maintained at atmospheric pressure, even in the event of leakage at the first sealing barrier.

In the first, second and fourth embodiments, the body of the coupling element is formed of only two parts, namely the one-piece part comprising the parts 22, 23, 24 and 26, on the one hand, and the cover 28 attached to this one-piece part, which reduces the need for sealing gaskets.

In the first, third and fourth embodiments, the nature of the inner peripheral surface 285 of the cover, diverging towards the rear, facilitates creation of the annular clearance J of non-zero minimum radial thickness $e_{Jmin}$. In a variant not shown, this can be implemented at the inner peripheral surface 245 of the skirt 24, when it is used to delimit the volume V20 radially, as in the second embodiment.

The geometry of the collars 542 and 544, on the one hand, and of the inner volume V20 for receiving the flange 54, on the other hand, are optimized to facilitate the passage of fluid all around the rear collar 544, with minimal pressure losses, even in the configuration of maximum radial clearance of the nozzle 50 in relation to the male body 20.

The inner geometry of the nozzle 50 is optimized, in particular at the inner collar 66 of the plug 80 attached to, or integral with, the nozzle to limit pressure drops and guide the valve 70 radially in the open position.

In the first, second, and fourth embodiments, the use of a plug 80 insert makes it possible for the valve 70 to be mounted in the nozzle 50 from the rear. Given the type of valve 70, this is not essential in the third embodiment.

The invention is applicable irrespective of the nature of the fluid passing through the coupling, whether liquid or gaseous, and the direction of circulation of this fluid through the coupling.

The invention is applicable regardless of the exact nature of the sealing barriers. In a variant, not shown, the O-ring joints 56 and 58 of these sealing barriers are replaced by lip seals, possibly spring energized.

The invention is shown in the Figures in the case where only one of the elements 4 and 6 of the connection 2 complies with the invention. In a variant, both of these elements comply with the invention.

Whatever the embodiment, the sealing barriers are compatible with the movement of the flange 54 within the volume V20, that is, with the deflection of the flange, without loss of sealing at the joints 56 and 58 or 56 and 56' and 58 and 58'.

Whatever the embodiment, in a variant, the radial plane P20 parallel to which the flange 54 can move in the housing formed by the volume V20 may not be perpendicular to the axis X20, but inclined in relation to this axis. Thus, the radial plane P20 forms an angle of 75° to 105° in relation to the axis X20. The radial directions and radial or peripheral surfaces are adapted accordingly.

The embodiments and variants contemplated above may be combined to generate new embodiments of the invention defined by the claims.

The invention claimed is:

1. A male or female fluid coupling element, designed for joining pressurized fluid pipelines,
    said coupling element comprising a body, an nozzle and a valve;
    the body extending along a longitudinal axis, between a front side, facing in a press-fitting direction of the coupling element with a complementary connection element, and a rear side opposite the front side;
    the body delimiting, on the one hand, a housing for partially receiving the nozzle and, on the other hand, at least a first portion of an inner conduit for circulating fluid in the coupling element, the first portion being arranged towards the rear in relation to the receiving housing and communicating fluidly with the receiving housing,
    the nozzle including a tubular part projecting forward from the body;
    a second portion of the inner conduit being arranged in an inner volume of the nozzle and delimited on the front by a front opening of the tubular part;
    the valve being housed in the inner volume of the nozzle with the possibility of movement between an advanced closed position in which the valve caps the front opening of the tubular part and a retracted opening position where the valve does not oppose the circulation of fluid in the inner conduit;
    the nozzle having a flange formed projecting from and towards the rear in relation to the tubular part, the flange being received in the receiving housing with the possibility of movement in relation to the body only parallel to a plane radial to the longitudinal axis; and
    a first sealing barrier formed by at least one sealing joint being interposed between a rear surface of the flange and a front face of the body, this front face delimiting the receiving housing on the rear side and being arranged opposite the rear surface of the flange,
    wherein
    a second sealing barrier formed by at least one sealing joint is interposed between a front surface of the flange and a rear face of the body, this rear face delimiting the receiving housing on the front side and being arranged opposite the front surface of the flange;
    a third portion of the inner conduit, intermediate between the first portion and the second portion, is delimited radially around the flange, between an outer peripheral surface of the flange and an inner peripheral surface of the body delimiting the receiving housing radially to the longitudinal axis;
    a plug caps the second portion of the inner conduit at the rear;
    the second and third portions of the inner conduit are in fluid communication through at least one passage arranged in the nozzle and which opens into the inner volume of the nozzle, in front of the plug, and on the outer peripheral surface of the flange; and
    an inner chamber is arranged in the coupling element and separated from the inner conduit by the body, the flange, the plug and the first sealing barrier.

2. The coupling element according to claim 1, wherein a ratio between an area of a sealing section delimited by the second sealing barrier and an area of a sealing section delimited by the first sealing barrier is between 0.85 and 1.15.

3. The coupling element according to claim 2, wherein the ratio is between 0.95 and 1.05.

4. The coupling element according to claim 3, wherein the ratio is equal to 1.

5. The coupling element according to claim 1, wherein at least one vent connects the inner chamber to the outside of the coupling element and extends through the body.

6. The coupling element according to claim 5, wherein the vent extends parallel to the radial plane.

7. The coupling element according to claim 1, wherein the inner chamber is delimited by an inner part of the body, which is frustoconical in shape centered on an axis parallel to the longitudinal axis, converging towards the rear of the coupling element, and which is connected to an intermediate portion of the body arranged around the inner part by at least one connecting bracket, wherein the first portion of the inner conduit extends between the inner part and the intermediate portion of the body, and wherein the receiving housing opens towards the rear into the first portion of the inner conduit.

8. The coupling element according to claim 7, wherein a ratio between a thickness of a connecting bracket, measured parallel to the longitudinal axis of the body, and a length of the inner part of the body, measured along the same longitudinal axis, is strictly less than 1.

9. The coupling element according to claim 8, wherein the ratio is between 0.15 and 0.40.

10. The coupling element according to claim 9, wherein the ratio is equal to 0.25.

11. The coupling element according to claim 7, wherein the inner part of the body delimiting the inner chamber, the connecting bracket(s) and the intermediate portion of the body together form a single piece.

12. The coupling element according to claim 1, wherein the flange comprises a front collar forming the front surface of the flange and a rear collar forming the rear surface of the flange, wherein when an outer peripheral surface of the front collar is radially in contact with the inner peripheral surface of the body radially defining the receiving volume, an annular clearance of non-zero minimum radial thickness exists between an outer peripheral surface of the rear collar and the inner peripheral surface of the body, and wherein the first and second portions of the inner conduit are in fluid communication through the annular clearance.

13. The coupling element according to claim 12, wherein the body comprises a cover, fitted into a skirt of the body and which defines a front opening of the body through which the tubular part of the nozzle projects out of the body towards the front, wherein the second sealing barrier is interposed between a front surface of the front collar and a rear face of the cover which surrounds the front opening, wherein the inner peripheral surface of the body is formed on the cover, wherein a rear surface portion of the inner peripheral surface is flared towards the rear and radially faces the outer peripheral surface of the rear collars and wherein the outer peripheral surfaces of the front and rear collars are cylindrical with a circular outer cross-section, of the same outer diameter, and coaxial.

14. The coupling element according to claim 1, wherein the rear surface and the front surface of the flange are flat axial surfaces and wherein each sealing joint forming the first sealing barrier and each sealing joint forming the second sealing barrier is received in a respective groove on the back surface of the flange or a groove on the front surface of the flange.

15. The coupling element according to claim 1, wherein the plug is a part attached to the nozzle, mounted in a sealed manner in the inner volume of the nozzle opposite a rear inner shoulder of the nozzle.

16. The coupling element according to claim 1, wherein the valve is equipped with a skirt open towards the rear, wherein the skirt of the valve is pierced with through openings which open onto an outer peripheral surface of the valve, and wherein the nozzle delimits an inner surface capable of interacting radially with the valve, to the rear of the through openings, when the valve is in the retracted open position.

17. The coupling element according to claim 1, wherein each passage arranged in the nozzle extends along an inclined axis which converges towards the front, towards a central longitudinal axis of the tubular part, with an angle of inclination in relation to this axis of between 30° and 50°.

18. The coupling element according to claim 17, wherein the angle of inclination is equal to 40°.

19. The coupling element according to claim 1, wherein each passage arranged in the nozzle has a section in the form of a ring portion centered on a central longitudinal axis of the tubular part.

20. The coupling element according to claim 1, wherein the nozzle comprises a plunger mounted inside the tubular part, wherein the valve is annular in shape and mounted around the plunger and wherein, in the advanced closing position, the valve interacts in a sealed manner with the plunger and with the tubular part in order to close off the front opening of the tubular part.

21. A connection for joining pressurized fluid pipelines, said connection comprising a male coupling element and a female coupling element, wherein at least one of the coupling elements is according to claim 1.

* * * * *